United States Patent
Hoeven (10) Patent No.: US 9,413,164 B2
(45) Date of Patent: Aug. 9, 2016

(54) PROTECTION SYSTEM FOR ELECTRICAL POWER DISTRIBUTION SYSTEM USING DIRECTIONAL CURRENT DETECTION AND LOGIC WITHIN PROTECTIVE RELAYS

(75) Inventor: Thomas Hoeven, Oslo (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 764 days.

(21) Appl. No.: 13/880,372

(22) PCT Filed: Oct. 12, 2011

(86) PCT No.: PCT/EP2011/067759
§ 371 (c)(1),
(2), (4) Date: Apr. 18, 2013

(87) PCT Pub. No.: WO2012/052325
PCT Pub. Date: Apr. 26, 2012

(65) Prior Publication Data
US 2013/0215543 A1    Aug. 22, 2013

(30) Foreign Application Priority Data
Oct. 18, 2010  (EP) .................................. 10187884

(51) Int. Cl.
*H02H 7/22* (2006.01)
*H02H 3/08* (2006.01)
(Continued)

(52) U.S. Cl.
CPC .................. *H02H 7/22* (2013.01); *B63H 23/24* (2013.01); *B63H 25/42* (2013.01); *H02H 3/081* (2013.01); *H02H 3/05* (2013.01); *H02H 7/261* (2013.01)

(58) Field of Classification Search
CPC ......... H02H 7/22; H02H 3/081; B63H 23/24; B63H 25/42
See application file for complete search history.

(56) References Cited

U.S. PATENT DOCUMENTS

| | | | |
|---|---|---|---|
| 3,553,968 A | 1/1971 | Armistead | 405/211 |
| 6,937,453 B2 | 8/2005 | Kase et al. | 361/81 |

(Continued)

FOREIGN PATENT DOCUMENTS

| | | | | |
|---|---|---|---|---|
| CN | 1489253 A | 4/2004 | .............. | H02H 3/08 |
| CN | 101044663 A | 9/2007 | .............. | H02H 3/38 |

(Continued)

OTHER PUBLICATIONS

International Search Report and Written Opinion, Application No. PCT/EP2011/067759, 9 pages, Dec. 27, 2011.

(Continued)

*Primary Examiner* — Zeev V Kitov
(74) *Attorney, Agent, or Firm* — Slayden Grubert Beard PLLC (57) ABSTRACT

A power distribution system for a dynamically positioned vessel may include: a plurality of busses including a first bus to which a load is connectable; a plurality of switches including a first switch and a second switch, wherein the plurality of busses is connected via the switches in a interjacent manner to form a ring, the first bus is connected between the first switch and the second switch, and the power distribution system is configured to concurrently open the first switch and second switches, if a first current flowing via the first switch towards the first bus is above a predetermined current threshold for longer than a predetermined time and a second current flowing via the second switch towards the first bus is above the predetermined current threshold for longer than the predetermined time, thereby disconnecting the first bus from the ring while all other buses remain connected together.

13 Claims, 10 Drawing Sheets

(51) Int. Cl.
    *B63H 23/24*     (2006.01)
    *B63H 25/42*     (2006.01)
    *H02H 3/05*     (2006.01)
    *H02H 7/26*     (2006.01)

(56) References Cited

U.S. PATENT DOCUMENTS

| | | | |
|---|---|---|---|
| 7,542,256 B2 | 6/2009 | Premerlani et al. | 361/62 |
| 8,400,010 B2 | 3/2013 | Blystad et al. | 307/9.1 |
| 2003/0151867 A1* | 8/2003 | Kase | H02H 3/081 361/77 |
| 2008/0158750 A1* | 7/2008 | Premerlani | H02H 7/30 361/63 |
| 2008/0158753 A1 | 7/2008 | Premerlani et al. | 361/80 |

FOREIGN PATENT DOCUMENTS

| | | | |
|---|---|---|---|
| CN | 101237144 A | 8/2008 | H02H 7/26 |
| CN | 101836342 A | 9/2010 | H02J 3/00 |
| EP | 1335470 A2 | 8/2003 | H02H 3/08 |
| EP | 1940002 A2 | 7/2008 | H02H 3/08 |
| JP | 6086453 A | 5/1985 | G01B 11/30 |
| JP | 62207130 A | 9/1987 | H02H 3/26 |
| JP | 1311820 A | 12/1989 | H02H 3/38 |
| JP | 2008167647 A | 7/2008 | H02H 3/38 |
| JP | 2009055763 A | 3/2009 | H02H 3/00 |
| WO | 2012/052325 A1 | 4/2012 | B63B 39/08 |

OTHER PUBLICATIONS

Chinese Office Action, Application No. 201180050257.2, 37 pages, Jul. 15, 2014.
Canadian Office Action, Application No. 2814884, 2 pages, Jul. 31, 2014.
Japanese Office Action, Application No. 2013534250, 9 pages, Sep. 1, 2014.

\* cited by examiner

THRUSTERS NUMBERING

PROTECTION SYSTEM FOR ELECTRICAL POWER DISTRIBUTION SYSTEM USING DIRECTIONAL CURRENT DETECTION AND LOGIC WITHIN PROTECTIVE RELAYS

CROSS-REFERENCE TO RELATED APPLICATIONS

This application is a U.S. National Stage Application of International Application No. PCT/EP2011/067759 filed Oct. 12, 2011 which designates the United States of America, and claims priority to EP Patent Application No. 10187884.1 filed Oct. 18, 2010 The contents of which are hereby incorporated by reference in their entirety.

TECHNICAL FIELD

The present disclosure relates to an electrical power distribution system, e.g., for a dynamically positioned vessel and to a method for power distribution, e.g., to directional overcurrent fault protection using programmable logic available inside modern protective relays. For example the present disclosure relates to enhanced electric power distribution directional fault current protection using programmable logic within protective relays which is particularly suitable for isolated power systems like those found on dynamically positioned vessels where high reliability is required. Further, the present disclosure relates to a power distribution system, e.g., for a dynamically positionable vessel, wherein the power distribution system has a ring-shaped topology, thereby enabling taking measures against a fault. It is designed to separate a faulty bus comprised in the power distribution system without affecting the operation of the remaining busses of the power distribution system.

BACKGROUND

Dynamically positioned ships and vessels (such as a sea-based offshore platform, an oil platform or a drilling platform or a drillings rig) may use their propellers or thrusters to stay in position where stationary operation is required and vessels of this type may include drilling and/or production rigs for conveying oil and/or gas, e.g., from a drilling hole at the sea ground. For using electric propulsion (propellers or thrusters) these vessels may depend on a reliable power generation and distribution to supply electric propulsion machinery with electric energy, in order to maintain a desired position at the sea and in order to thus achieve a safe marine operation. For example, such kind of vessels Dynamic positioning (DP) may be used in water depths and areas where jack-up rigs and anchoring systems are not feasible. A conventional power generation system or power distribution system may be designed such that several isolated power distribution groups (typically 2-8) are operated so that if one group fails the remaining groups may be sufficient to hold the vessel in position. For example, in a conventional system redundant power generation (such as a large number of generators) may be required within several groups or all groups of the conventional power generation system.

For example, on some vessels, redundant converters and DC-links may be used in a conventional system to obtain a fault tolerant power system by connecting the energy flow between the isolated power generation and distribution islands using converters and DC-links. This may eliminate or at least reduce the problem of running excessive number of generators but may produce an expensive array of converters. Thereby, the additional converters may add significantly to the cost of the power generation system or power distribution system. This power distribution system may also be more maintenance-intensive and may contain additional sources of failures. Using a vessel management system, such as an automation system as part of the protection scheme, has been evaluated for some projects, but has been abandoned partly due to issues with response time. It may not be desirable to depend on additional systems for electric fault protection. This may also be unacceptable to classification societies and many customers.

Document EP 1 940 002 A2 discloses a relay device and a corresponding method, wherein a first value to the direction of a fault current flowing into the partial differential zone is assigned, a second value to the direction of the fault current flowing out of the partial differential zone is assigned, the values assigned to the fault currents are compared and it is determined, if the fault currents are flowing into the partial differential zone. Thereby, each node interfaces with the central processor 304 to provide node data for processing, decision making and the like.

Document U.S. Pat. No. 3,553,968 discloses a stabilized offshore platform located in a relatively deep body of water and supported by rigidly fixed upright legs.

Document EP 1 335 470 A2 discloses a directional comparison distance relay system for protecting a power transmission line including a directional distance relay element for deciding whether a fault is in forward or reverse directions.

There may be a need for a power distribution system for a dynamically positioned vessel and for a method for power distribution which is improved regarding fault handling and which at the same time does not require a large number of generators or converters. Further, there may be a need for a power distribution system and for a method for power distribution, wherein a single failure or fault within the power distribution system may not result in the vessel drifting away from its position.

Differential protection is often used in networks to isolate a faulty bus. On vessels involved in oil production and drilling, transient conditions may cause erratic trips by differential protection systems. These transient conditions are caused by starting of large motors and loads on a smaller, isolated electric power network causing larger fluctuations in frequency, voltages and harmonic content than what is normally observed for land-based electrical systems.

SUMMARY

One embodiment provides a power distribution system, e.g., for a dynamically positionable vessel, the power distribution system comprising: a plurality of busses comprising a first bus to which a load is connectable; a plurality of switches comprising a first switch and a second switch, wherein the plurality of busses is connected via the plurality of switches in a interjacent manner to form a ring, the first bus is connected in between the first switch and the second switch, and the power distribution system is configured to open the first switch and concurrently open the second switch, if a first current flowing via the first switch in a direction towards the first bus is above a predetermined current threshold for longer than a predetermined time duration and a second current flowing via the second switch in a direction towards the first bus is above the predetermined current threshold for longer than the predetermined time duration, thereby disconnecting the first bus from the ring, wherein each of the first switch and the second switch comprises a programmable relay including a logical unit providing logical functionality, wherein the first bus is identified using the logical functionality within the first switch and the second switch.

In a further embodiment, the first switch is configured to determine the first current and a direction of the first current and the second switch is configured to determine the second current and a direction of the second current.

In a further embodiment, the first switch is configured to send an inhibit signal to the second switch for inhibiting the second switch from opening, if a first opposite current flowing via the first switch in a direction away from the first bus is above the predetermined current threshold for longer than the predetermined time.

In a further embodiment, the second switch is configured to open, if the second switch does not receive the inhibit signal from the first switch and the second current flowing via the second switch in a direction towards the first bus is above the predetermined current threshold for longer than the predetermined time and if, e.g., additionally a voltage at the first bus is below a predetermined voltage threshold.

In a further embodiment, the second switch is configured to open, if a third current flowing via the second switch in a direction towards the first bus or in a direction away from the first bus is above another predetermined current threshold for longer than another predetermined time, wherein the other predetermined current threshold is greater than the predetermined current threshold and/or the other predetermined time is greater than the predetermined time.

In a further embodiment, the plurality of busses comprises a second bus connected to the first bus via the second switch, wherein the plurality of switches comprises a third switch connected to the second bus, wherein the second switch is configured to send an inhibit signal to the third switch for inhibiting the third switch from opening, if the second current via the second switch in the direction towards the first bus is above the predetermined current threshold for longer than the predetermined time. In a further embodiment, the power distribution system further comprises at least one generator connected to the first bus.

In a further embodiment, the power distribution system further comprises a generator switch via which the generator is connected to the first bus.

In a further embodiment, the load is connectable to the first bus via a load switch.

In a further embodiment, at least one of the third switch, the generator switch, and the load switch comprises a programmable relay including a logical unit.

Another embodiment provides a vessel comprising a power distribution system as disclosed above, the vessel being dynamically positioned using at least two electrical motors.

In a further embodiment, the vessel is configured for supporting an offshore oil platform or an offshore drilling platform.

Another embodiment provides a method for power distribution using a power distribution system, e.g., for a dynamically positioned vessel, e.g., the power distribution system according to one of the preceding claims, the power distribution system comprising: a plurality of busses comprising a first bus to which a load is connectable; a plurality of switches comprising a first switch and a second switch, wherein the plurality of busses is connected via the plurality of switches in an interjacent manner to form a ring, the first bus is connected in between the first switch and the second switch, the method comprising: determining a first current flowing via the first switch in a direction towards the first bus; determining a second current flowing via the second switch in a direction towards the first bus; and disconnecting the first bus from the ring by opening the first switch and concurrently opening the second switch, if the first current is above a predetermined current threshold for longer than a predetermined time duration and the second current is above the predetermined current threshold for longer than the predetermined time duration, wherein each of the first switch and the second switch comprises a programmable relay including a logical unit providing logical functionality, and wherein the first bus is identified using the logical functionality within the first switch and the second switch.

BRIEF DESCRIPTION OF THE DRAWINGS

Exemplary embodiments will be explained in more detail below on the basis of the schematic drawings, wherein.

DETAILED DESCRIPTION

The proposed power distribution system and method for power distribution protection may, according to an embodiment, be applied to a dynamically positioned ship and/or vessel, but may also be applied for other applications, where continued service after a fault is desirable, e.g., subsea power distribution systems.

For example proposed power distribution system and method for power distribution protection may employ logic in the protective relays instead of a traditional bus differential protection.

According to an embodiment a power distribution system is adapted for protecting the system against a fault. Thus, the power distribution system may also be referred to or may comprise features of a power system protection system. For example, logic within protective relays comprised in the power distribution system or power system protection system and directional fault current detection may be used to obtain discrimination in a looped electrical power network.

Dynamically positioned vessels is only one possible application of the power distribution system but the invention is not limited to this use case.

According to an embodiment a power distribution system (for distributing electrical power) for a dynamically positionable vessel (such as a ship, an oil platform or drilling rig) is provided, wherein the power distribution system comprises a plurality of busses (each of the busses comprising an electrical conductor, such as for example a copper bar) comprising a first bus to which a load (such as a propeller, a thruster or another kind of electrical motor; or an energy supply device, such as an accumulator or a generator) is connectable (directly or indirectly); and a plurality of switches (allowing to adopt an open state and a closed state, e.g., switches which are controllable, e.g., comprising a breaker and a relay which may be programmable and which may allow computation and/or performing logical operations) comprising a first switch and a second switch. Herein, the plurality of busses is connected via the plurality of switches in an interjacent (intercalated) manner to form a ring (such that a bus is connected to a switch, this switch is connected to another bus and the other bus is connected to another switch and so on until the last switch is connected to the first bus to form a ring-shaped arrangement or annular arrangement of alternating busses and switches), wherein the first bus is connected in between the first switch and the second switch (e.g., without a converter). Herein, the power distribution system is configured to open the first switch (such that the first switch adopts its open state) and concurrently open the second switch (such that the second switch adopts its open state), if a first (electrical) current flowing via the first switch (from a neighbouring bus) in a direction towards the first bus is above a predetermined current threshold (such as for example 1000 A to 10000 A) for longer than a predetermined time duration (such as for example 0.2 s to 1 s) and also a second current flowing via the second switch (from another neighbouring bus) in a direction towards the first bus is above the predetermined current threshold for longer than the predetermined time duration. Thereby, by opening the first switch and the second switch the first bus is disconnected from the ring. For example, the power distribution system using may employ logic in protective relays to disconnect the first bus from the ring. Thereby, each of the first switch and the second switch comprises a programmable relay including a logical unit providing logical functionality, wherein the first bus is identified using the logical functionality within the first switch and the second switch.

For example, the first switch and the second switch may autonomously cause disconnection of the first bus from the ring employing their logical functionality without requiring a central processor that controls opening and/or closing of the first switch and the second switch.

In the context of the present application the term "switch" may denote an (controllable) arrangement that enables opening and closing of an electrical connection between two conductor (such as busses), e.g., in a controlled manner. A switch may comprise a circuit breaker (representing the element actually establishing the electrical connection) and a controller, such as a (programmable) relay (e.g., comprising logic circuitry), that controls the opening and closing of the circuit breaker.

For example, at the first bus a fault occurred such that a high current flows towards the first bus via the first switch and also a high current flows towards the first bus via the second switch. For example, the opening the first switch and the opening the second switch may be performed according to a predetermined time-current characteristic curve which may be adapted to the particular application. For example, when the first switch comprises a breaker and a smart relay (comprising programmable logic) and when the second switch also comprises a breaker and a smart relay controlling the breaker the faulty first bus may be detected by inhibiting opening of all switches of the ring except the first switch and the second switch. Herein all other switches (except the first switch and the second switch) may be inhibited from opening by sending appropriate inhibit signals to all switches but the first switch and the second switch. For example, logic within the relay controlling the corresponding breaker (the relay and the breaker forming the switch) may be used in the ring structure to identify the faulty bus and disconnect the faulty bus from the ring, in order to separate the faulty first bus from the ring and thus to open the ring. Still, in the opened ring all remaining busses of the plurality of busses remain connected to each other. Thereby, a reduced number of generators are required in order to supply one or more loads connected to the remaining busses with electric energy. Thereby, the efficiency of the power distribution system may be improved and the costs of the power distribution system may be reduced compared to a conventional power distribution system.

For example, the power distribution system comprises several power busses which are connected in a loop. In the event of a fault on a single bus (the first bus), only the first bus may be disconnected at both ends leaving all of the remaining generator and distribution system operational and connected together. Thereby, fewer redundant generators are required to operate in a given situation of a fault. Thereby, a maintenance, fuel consumption and emissions may be reduced. It may also be possible to maintain operation of a vessel comprising the power distribution system after a single electrical fault has occurred without the need to repair this fault (at the first bus). The power distribution system will remain as one connected system after the first fault, avoiding the problem that one island may be underpowered while the other has redundant generating capacity.

For example, the need for bus-bar differential protection may be eliminated. Bus-bar differential protection may cause problems during transient conditions and trip (open on fault) in situations that are often found during normal operations on a drilling or production rig. Such erratic trips may be critical on a DP2 or DP3 class vessel. The proposed system may allow continued operation according to DP2 or DP3 class after an initial electrical fault. In this case a DP2 vessel is required to remain in position after a second electrical fault, and a DP3 class vessel required to stay in position after a second fault of electrical or mechanical nature. This will allow continued operation of the vessel while waiting for a repair of the first fault.

For example, connecting the power generation and distribution islands (the plurality of busses) using standard circuit breakers so that they are connected in a single closed ring may eliminate the need to operate more than one redundant generator for the entire vessel comprising the power generation or power distribution system. This may also allow continued operation of the power distribution as a single, connected bus after a fault without the need to rearrange the power distribution configuration after a first fault. According to an embodiment a protection scheme is provided that isolates only (exclusively) the faulty part (the first bus) without disconnecting other parts (other busses of the power distribution system).

Thereby, the faulty part or faulty bus (the first bus) may be identified using logical functionality or programmable logic capability within the switches (e.g., within the protective relays controlling the switches). For example, a protective relay (such as the Siemens SIPROTEC protective relay) may be used and applied within the power distribution system. The Siemens SIPRTEC protective relay comprises built-in logic and also built-in current and voltage measurement capability. These relays are standard and widely used components of power distribution systems. They are well-proven protective devices and their built-in features may allow logical operations to become part of the protective scheme without using additional controllers or programmable logical controllers (PLCs).

The proposed topology of the power distribution system and the capability to separate a bus from the power distribution system in case of a fault on this bus may reduce the maintenance requirements and fuel costs, as fewer generators may be needed to run in the operating situations. Further, a higher availability for the power generation system may be achieved, as it may be allowed to continue operation after an electrical fault has occurred, even without operator intervention. Only the faulty part may be disconnected, while the remaining system continues to operate as a single, connected power generation and distribution system. Further, the need for additional converters and DC-links as required in some other conventional fault tolerant power generation systems may be eliminated. Thereby, the complexity and initial investment may be reduced. Further, only standard, well-proven components may be used to build the power distribution system according to an embodiment.

According to an embodiment the first switch (e.g., comprising a breaker controlled by a relay) is configured to determine (e.g., comprising measuring, deriving and/or computing) the first current and a direction of the first current and the second switch (e.g., comprising a breaker and a relay controlling the breaker) is configured to determine (e.g., comprising measuring, deriving and/or computing) the second current and a direction of the second current. Thereby, the condition under which the first bus is disconnected from the power distribution system may be easily determined. Further, conventional components (such as a programmable relay with current measurement capability) may be used to construct the power distribution system.

According to an embodiment the first switch is configured to send an inhibit signal (requiring a signal line between the first switch and the second switch for communicating between the first switch and the second switch, e.g., communicating in the direction from the first switch to the second switch) to the second switch for inhibiting the second switch from opening (the inhibit signal may also be referred to as inhibit 67 trip), if a first opposite current (a current flowing in a direction opposite to the direction of the flow of the first current) flowing via the first switch in a direction away from the first bus is above the predetermined current threshold for longer than the predetermined time. In this situation, the first bus is not a sink of current, but another bus must be the sink of current and must thus be faulty. In this situation, the first bus is not the faulty bus and should not be disconnected from the power distribution system. Thus, e.g., the second switch should not open in order to keep the first bus connected to the power distribution system. Herein, logical processing capability of a relay comprised in the second switch may be employed.

According to an embodiment the second switch is configured to open, if the second switch does not receive the inhibit signal from the first switch and the second current flowing via the second switch in a direction towards the first bus is above the predetermined current threshold for longer than the predetermined time and if, e.g., additionally a voltage at the first bus is below a predetermined voltage threshold. For example, the second switch does not receive any inhibit signal from any other switch of the plurality of switches. For example, all switches of the plurality of switches may receive an inhibit signal (from another switch of the plurality of switches) with the exception of two switches (the first switch and the second switch) which do not receive an inhibit signal. The two switches not receiving any inhibit signal may then open, to disconnect the bus in between the two switches which does not receive an inhibit signal from the power distribution system. Herein, logical processing capability and current measurement capability and voltage measurement capability of the switches may be employed.

According to an embodiment the second switch is configured to open also, if a third current flowing via the second switch in a direction towards the first bus or in a direction away from the first bus is above another predetermined current threshold for longer than another predetermined time, wherein the other predetermined current threshold is greater than the predetermined current threshold and/or the other predetermined time is greater than the predetermined time. The third current trip will occur if opening on directional currents does not take place. Using a programmable relay for building the second switch (and also, e.g., building all other switches) allows including further conditions and relationships for defining in which condition or situation the second switch should open. Thereby, a larger flexibility for determining the faulty bus is enabled.

According to an embodiment the plurality of busses comprises a second bus connected to the first bus via the second switch, wherein the plurality of switches comprises a third switch connected to the second bus (but not between the first bus and the second bus), wherein the second switch is configured to send an inhibit signal to the third switch for inhibiting the third switch from opening, if the second current via the second switch in the direction towards the first bus is above the predetermined current threshold for longer than the predetermined time. Thereby, the third switch connecting the second bus with a further bus of the plurality of busses is maintained in a closed state, in order to not separate any other bus (except the first bus) from the power distribution system. Thereby, it may be ensured that only the first bus (being the faulty bus) is separated from the annular power distribution system to achieve a linear or chain-like power distribution system being not connected in a loop and not forming a ring, when the faulty first bus is disconnected from the power distribution system.

According to an embodiment the power distribution system comprises at least one generator connected to the first bus. The generator may supply electric energy to the first bus. For example, the power distribution system may comprise one or more generators, wherein to each bus at least one generator may be connected. Separating the first bus from the power distribution system may comprise also separating the generator connected to the first bus from the power distribution system. Further, separating the first bus from the power distribution system may include separating any load connected to the first bus from the power distribution system. Thus, also in the case a fault occurred at a load or at a generator connected to the first bus the first bus may not be separated from the power distribution system. Further, a fault may occur at the first bus itself (such as a short circuit to ground) without requiring that a fault occurs at either a generator or a load connected to the first bus.

According to an embodiment the power distribution system further comprises a generator circuit breaker (also referred to a generator switch) via which the generator is connected to the first bus. The generator circuit breaker is controlled by a (programmable) relay having current measurement capabilities and/or voltage measurement capabilities. Thus, in case of a failure of the generator itself it may be separated from the first bus in a fast manner eliminating the necessity to separate the first bus from the power distribution system. For example, a time-current characteristic curve of the generator switch may be such that the generator switch opens before the first switch or second switch open, in order to keep the first bus connected to the power distribution system (still forming a ring), when the fault did not occur at the first bus itself but occurred at the generator. Thereby, the ring structure of the power distribution system may be maintained in case of a fault at one of the generators.

According to an embodiment the load is connectable to the first bus via a load circuit breaker (also referred to as load switch). For example, the circuit breaker which may be controlled by a (programmable) relay having current measurement capabilities and voltage measurement capabilities and providing logic computations. For example, a time-current characteristic of the load switch may be such that the load switch opens before the first switch or the second switch opens, in order to keep the first bus connected to the annular power distribution system in the case a fault occurred at the load. Thereby, the power distribution system may be maintained in the advantageous ring structure when the fault occurred exclusively at a load connected to the power distribution system. For example, one or more load devices may be connected to each bus of the plurality of busses.

According to an embodiment at least one of the third switch, the generator switch, and the load switch comprises a programmable relay including a logical unit, wherein the relay may control a breaker for opening or closing the switch. For example, the Siemens SIPROTEC protective relay may be employed.

According to an embodiment a vessel (such as a floating offshore platform, a drilling rig, an oil platform, comprising a power distribution system as explained above is provided, wherein the vessel is dynamically positionable using at least two electrical motors (connected to a propeller or a thruster) being connected to electric power bus(es) as the load. The vessel may be kept at a particular position (in the sea or at the sea) by activating one or more propellers or thrusters driven by electric motors.

For example, a two-lineup switchgear configuration for a DP class 2 vessel is considered, where it is permitted to lose 2 thrusters, one on an initial fault, the other on a later second fault. In a DP class 2 vessel only electrical faults are considered. The vessel must be able to safely finish its operation after an electrical fault. For a fault tolerant system the vessel must be able to do the same for a second fault occurring after certain types of first faults. Such first faults may include a faulty breaker, generator, thruster or bus.

According to an another embodiment a four-lineup switchgear configuration for a DP class 3 vessel is considered, where it is permitted to lose 3 thrusters, one on an initial fault, and two more on the second fault. In a DP class 3 vessel, faults affecting entire rooms must also be considered. This may include a fire or flooding of an entire room. For the proposed fault tolerant system a condition is that the first fault is limited to an electrical component, like a faulty breaker, generator, thruster or bus. The second fault may affect a complete room, and the vessel may be able to safely finish its operation after such a fault. Such a fault may result in the loss of two thrusters, in addition to one that may have failed as a result of the first (electrical) fault).

According to an embodiment a eight-lineup switchgear configuration for a DP class 3 vessel is considered, where it is permitted to lose 2 thrusters, one on an initial fault, the other one on a later second fault. Similar to the four-lineup switchgear configuration for the DP class 3 vessel, but each of the generators and busses are provided in their own, separate fire-proved room. This makes the vessel more expensive to construct but may be compensated for having 6 thrusters remaining after two faults. This may allow smaller thrusters to be used than in the DP class 3 vessel having a four-line up switch gear, where the vessel may only have 5 thrusters remaining after two faults.

For example, the two-line up switch gear for a DP class 2 vessel may include two separate rooms, the four-line up switch gear for a DP class 3 vessel must include four separate rooms and the eight-line up switch gear for a DP class 3 vessel must include eight separated rooms within which several components of the power distribution system are installed.

According to an embodiment the vessel is configured for supporting a floating offshore oil platform or an offshore drilling platform. The vessel may be at least partially submersed in the sea.

It should be understood that features (individually or in any combination) disclosed, described or mentioned with respect to a power distribution system may also be applied to a method for power distribution (individually or in any combination).

According to an embodiment a method for power distribution using a power distribution system for a dynamically positionable vessel, e.g., the power distribution system as described above, is provided, wherein the power distribution system comprises a plurality of busses comprising a first bus to which a load is connectable and a plurality of switches comprising a first switch and a second switch. Herein, the plurality of busses is connected via the plurality of switches in an interjacent manner to form a ring, wherein the first bus is connected in between the first switch and the second switch. Herein, the method comprises determining (e.g., comprising measuring, deriving, computing and/or estimating) a first current flowing via the first switch in a direction towards the first bus; determining (e.g., comprising measuring, deriving, computing and/or estimating) a second current flowing via the second switch in a direction towards the first bus; and disconnecting the first bus from the ring by opening the first switch and concurrently opening the second switch, if the first current is above a predetermined current threshold for longer than a predetermined time duration and if the second current is above the predetermined current threshold for longer than the predetermined time duration. Thereby, each of the first switch and the second switch comprises a programmable relay including a logical unit providing logical functionality, wherein the first bus is identified using the logical functionality within the first switch and the second switch.

It has to be noted that embodiments are described herein with reference to different subject matters. For example, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, e.g., between features of the method type claims and features of the apparatus type claims is considered as to be disclosed with this document.

Figure 1:
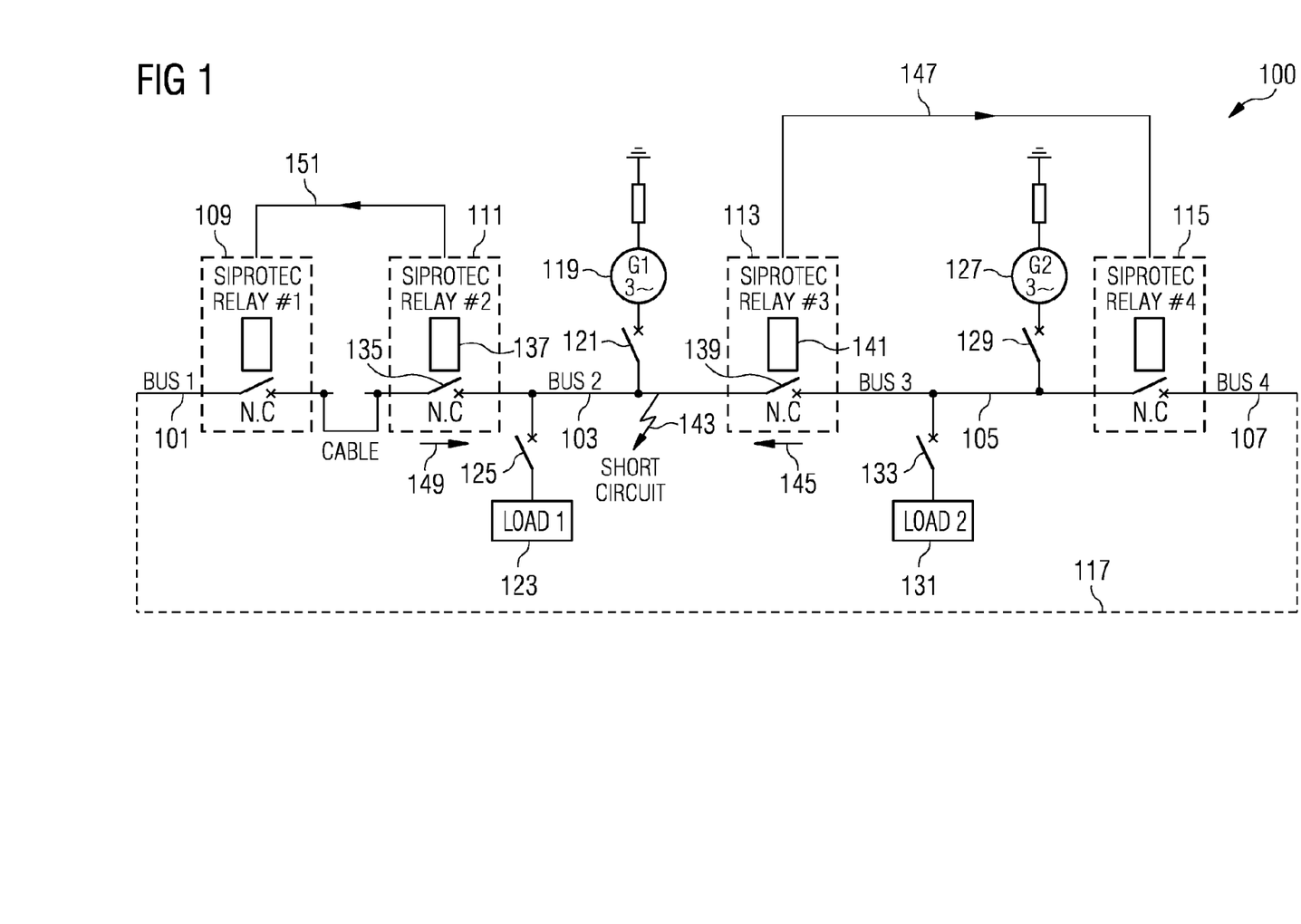
FIG. 1 schematically illustrates a power distribution system according to an example embodiment.

FIG. 1 schematically illustrates a power distribution system 100 according to an embodiment. The power distribution system 100 comprises a plurality of busses from which only a first bus 101, a second bus 103, a third bus 105 and a fourth bus 107 are illustrated. The busses are connected to each other using a plurality of switches, from which only the switches 109, 111, 113, 115 are illustrated. The busses are connected in series using the switches in an alternating manner to form a ring 117 formed by alternating busses and switches.

A generator 119 is connected via a switch 121 to the bus 103 to supply the bus 103 with electric energy. The electric energy supplied to the bus 103 is consumed by a load 123 which is connected via a load switch 125 to the bus 103. The generator 127 is connected via a generator switch 129 to the bus 105, to supply electric energy to the bus 105. A load 131 is connected via the switch 133 to the bus 105 to supply the electric energy to the load 131.

The bus 103 is connected to the bus 101 via the switch 111 and the bus 103 is connected to the bus 105 via the switch 113. For example, the switch 111 comprises a (normally closed, i.e n.c.) breaker 135 which is controlled by a relay 137. In the illustrated embodiment, the relay 137 is a Siemens SIPRTEC relay which may be programmed and which comprises a logic circuitry. Further, the relay 137 comprises a current measurement and a voltage measurement capability, in order to measure a current flowing from the bus 103 towards the bus 101 or to measure a current flowing from the bus 101 towards the bus 103. The switch 113 comprises a breaker 139 which is controlled by a relay 141 to set the breaker in an open state or a closed state. In the illustrated embodiment both the relays 137 and 141 are Siemens SIPRTEC relays allowing to perform logical operations and allowing to measure current and voltage flowing via the relays between adjacent busses.

During a normal operation of the power distribution system 100 the plurality of busses are connected by alternating (closed) switches to form an annular structure or ring structure.

Thereby, electrical power generated by the generators 119 or 127 may be distributed to any of the loads connected to any of the busses. Thereby, a reliable supply of sufficient electric power may be provided to all of the loads connected to the busses.

Under normal conditions (not fault occurs) all breakers of the switches 109, 111, 113 and 115 are closed. The generators 119, 127 may have a nominal current of 300 A (Ampere) and may maintain a sustained fault current of 900 A for at least 3 s.

In FIG. 1 a particular fault scenario is illustrated, wherein a short circuit 143 occurred at the bus 103. The short circuit 143 may be caused for example by a faulty connection of the bus 103 to ground. According to other embodiments, the faulty conditions may have been caused by different events. Because of the short circuit 143 a high current will flow from the generator 119 towards the short circuit 143. Further, as the switches 109, 111, 113 and 115 are normally closed, also a high current will flow from the generator 127 via the bus 105, the switch 113 (which is closed) towards the short circuit 143. Additionally, a high current will flow via the bus 101, the closed switch 109, the closed switch 111, the bus 103 towards the short circuit 143. These high currents may draw an excessive amount of electrical energy from the power distribution system and are thus undesired. According to an embodiment, the power distribution system 100 is configured to disconnect the faulty bus 103 (the bus where the fault occurred) from the ring structure 117 in order to allow the continued supply of electric energy to other loads of the power distribution system, such as load 131.

Since the fault occurred at the bus 103 (and not at the load 123 or the generator 119), the problem can not be solved by just opening the generator switch 121 or the load switch 125 to disconnect the generator 119 or the load 123 from the power distribution system, respectively. In contrast, the power distribution system 100 is configured to open the switches 111 and 113 in order to disconnect the bus 103 from the power distribution system 100 such that no fault current can occur flowing from the bus 105 towards the bus 103 and currents flowing from the bus 101 towards the bus 103.

The switch 113 will detect a current 145 flowing from the bus 105 to the bus 103 and will send an inhibit signal via the signal line 147 to the switch 115 connecting the bus 105 with the bus 107. The inhibit signal sent to the switch 115 will cause the switch 115 to remain closed, since the fault can not have occurred at the bus 105.

Further, the switch 111 will detect a current 149 flowing from the bus 101 towards the bus 103 and upon detection of this current the switch 111 will send an inhibit signal via a signal line 151 to the switch 109. The inhibit signal received by the switch 109 will cause the switch 109 to remain closed, since the bus 101 can not be the faulty bus, if the current 149 flows from the bus 101 towards the bus 103. Further, the switches 109 and also the switch 115 will send inhibit signals to their respective neighbouring switches within the ring 117 to cause these switches to resume their closed state.

Eventually all switches within the ring 117 will be inhibited except the switches 111 and 113 which will therefore adopt an open state. Thereby, the faulty bus 103 is separated from the power distribution system 100 and the power distribution system 100 has been opened to not any more form a ring structure. After separating the faulty bus 103 from the power distribution system consumers or loads connected to other busses (not connected to bus 103), such as the load 131, may be supplied with electric energy to ensure proper continued operation.

Figure 2:
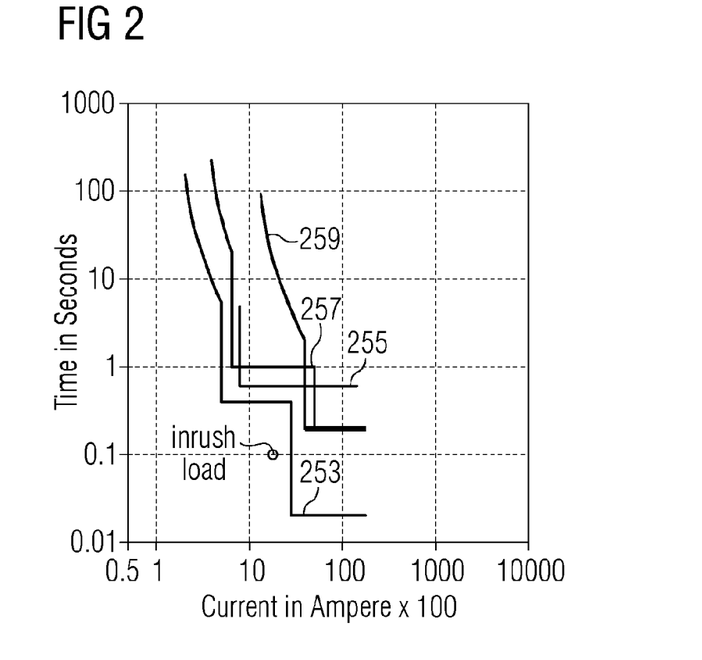
FIG. 2 illustrates graphs showing time-current characteristic curves of relays used in the power distribution system illustrated in FIG. 1.

FIG. 2 illustrates graphs of time-current characteristics of the switches 109, 111, 113, 115, 121, 125, 129, 133 (e.g., characteristics of the relays comprised in these switches). On the abscissa in FIG. 2 the current in Ampere is indicated, while on the ordinate the time in seconds is indicated, wherein both scales are logarithmic. The curves 253, 255, 257 and 259 indicate at which combinations of time and current flow the different switches will trip, i.e. open on fault. Curve 253 applies for switches 125 and 133; curve 259 applies for switches 109, 111, 13 and 115 (non-directional); curve 255 applies for switches 109, 111, 13 and 115 (directional); and curve 257 applies for switches 121 and 129.

Curve 253 for example illustrates the characteristics of the load switch 125 connecting the load 123 to the bus 103. For example, the load switch 123 will adapt an open state when a current between about 30×100 A and 200×100 A (or higher) lasted for about 0.02 s or longer. In this way a faulty load may be separated from the power distribution system 100 illustrated in FIG. 1 in a very fast manner before any of the other switches open.

Further, the curve 255 in FIG. 2 illustrates the time-current characteristics of the switches 111 and 113 when they detect a directional current 145 and 149, both currents flowing towards the bus 103. Thereby, the switches 111, 113 will adopt their open state when the currents 145, 149 assume particular values or exceed particular thresholds for particular time periods.

The curve 257 illustrates the characteristics of the generator switch 121 connecting the generator 119 to the bus 103 or the characteristics of the generator switch 129 connecting the generator 127 to the bus 105. The shapes of the time-current characteristic curves of the different switches 109, 111, 113, 115 (connecting neighbouring busses) may be very similar or equal but may be different from the characteristic curves of the load switches 125, 133 and may also be different from the characteristics of the generator switches 121 and 129. For example the shapes of the time-current characteristic curves may depend on the particular application.

The protective relay 121 for the generator 119 illustrated in FIG. 1 will trip according to the curve 257 illustrated in FIG. 2. The relay 137 will not see any current flowing from bus 103 to bus 101. Therefore, it will not issue an inhibit signal (block 67 trip) to the relay 141 of the switch 113. If there is no power generation to the left of the bus 103, the relay 137 of switch 111 will not take any action. (If there was power generation connected to bus 101, the relay 137 of switch 111 would also trip, and clear the fault on the left side of bus 103). The relay 141 of switch 113 will see a directional fault current 145 generated for example by generator 127, approximately 900 A. It does not receive an inhibit signal from the relay 137 of switch 111. Further, it does see under-voltage. It does see directional fault current to bus 103 and will initiate trip according to the curve 255 as illustrated in FIG. 2. It will not issue an inhibit signal to relay 137 of switch 111. For fault levels up to around 4000 A, it will trip before the protective relay 129 for generator 127 and clear the fault.

The directional fault current trip level must be set to below the sustained 3 s fault current available from the smallest generator. If the network shall be operated as a closed loop, the directional fault current trip level must be set to below half the sustained 3 s fault-current available from the smallest generator. The reason being that the fault-current from a single generator online on a closed bus loop will travel to the short circuit location from both directions. For DP operations, the minimum number of generators in operation will be 2.

Figure 3:
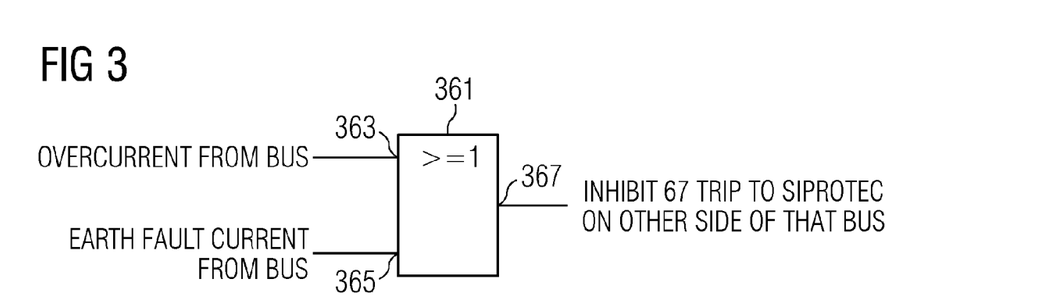
FIG. 3 illustrates a logic diagram employed in a relay used in the power distribution system illustrated in FIG. 1.

FIG. 3 illustrates a logical diagram of the protective relays comprised in switches 109, 111, 113 and 115 to illustrate under which conditions the relay of the switch 111 or 113 sends an inhibit signal to a switch upstream of a detected current 145 or 149. The switches 111 and 113 comprise a relay 137 and 141, respectively, which comprises each an OR gate 361. At a terminal 363 the OR gate 361 receives an indication that there is over-current from the bus adjacent to the corresponding switch. At a terminal 365 the OR gate 361 receives an indication that there is an earth fault current from the bus. If (at least) one of the signals received at the terminals 363 and 365 is a logical high signal, the OR gate 361 will issue at a terminal 367 a logical high signal which may be used as an inhibition signal to be sent to a switch on the other side of that bus (for example to the switches 109 and 115 as illustrated in FIG. 1).

Figure 4:
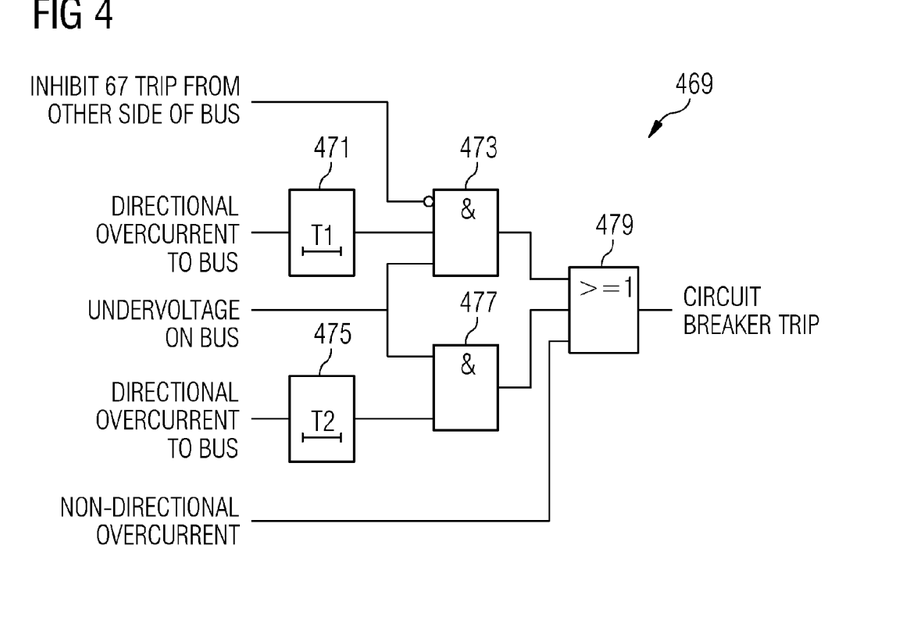
FIG. 4 illustrates a logic diagram employed in a relay used in the power distribution system illustrated in FIG. 1.

FIG. 4 illustrates a logical diagram of an operation of the relay 141 (or 137) controlling circuit breaker 113 (or 111), as illustrated in FIG. 1. For example, FIG. 4 illustrates the logical diagram indicating or describing under which conditions the circuit breaker 113 (or 111) will open, in order to separate the faulty bus 103 from the power distribution system 100. The logical circuitry 469 comprises a delay 471, an AND gate 473, a delay 475, an AND gate 477 and an OR gate 479. The delay 471 receives an indication of a directional over-current to the bus and delays this signal by a time T1 to send it to the AND gate 473. Further, the AND gate 473 receives an inhibit signal from another switch which is inverted. Further, the AND gate 473 receives an indication of an under-voltage on the bus. If there is no inhibit signal, a directional over-current to the bus and an indication of an under-voltage on the bus, the AND gate 473 will output a logical high signal.

To allow a trip (opening on fault) on a directional over-current all of the following conditions must be present:
  No inhibit signal is being received from the relay on the other side of the bus to which the fault current is flowing.
  A directional fault current is being detected. There is a time delay T1 on this signal to allow time for the relay on the other side of the bus to issue an inhibit signal. This delay may be selected to provide proper relay coordination. A suitable time may be in the range of 150-300 ms. For some power systems, a shorter time will be required, which may require faster logic than what is available in protective relays available on the market today.
  A bus under-voltage is being detected.
  If there is a fault that causes the relay on the other side of the bus not to issue inhibit when it should, the relay will trip on directional over-current anyway after a delay T2. For example, T2 must be longer than T1. Finally, the breaker will be tripped on non-directional over-current.

Figure 5:
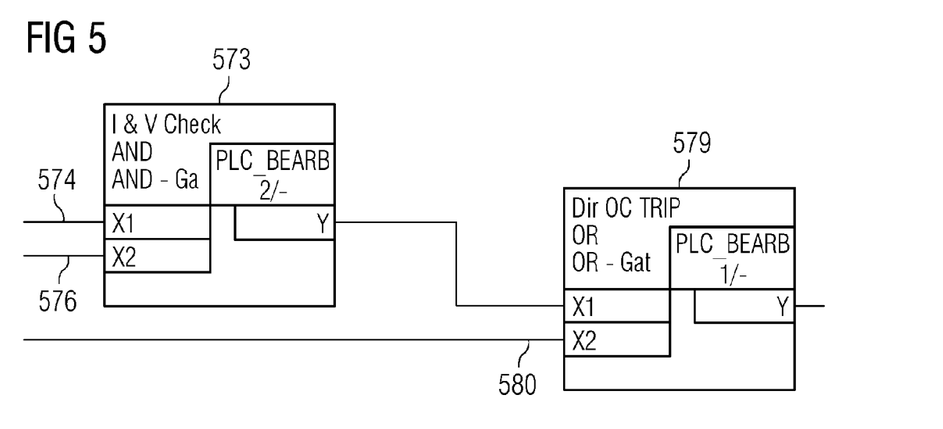
FIG. 5 illustrates a logic diagram employed in a relay used in the power distribution system illustrated in FIG. 1.

FIG. 5 illustrates an implementation a part of the logical circuit 469 illustrated in FIG. 4 on a Siemens SIPROTEC relay and trip on directional earth-fault. Herein, the AND gate 573 receives an indication of a directional over-current at a terminal 574 and an indication of an under-voltage at a terminal 576. The OR gate 579 receives the result of the AND gate 573 and at a terminal 580 an indication of a directional earth-fault.

Figure 6:
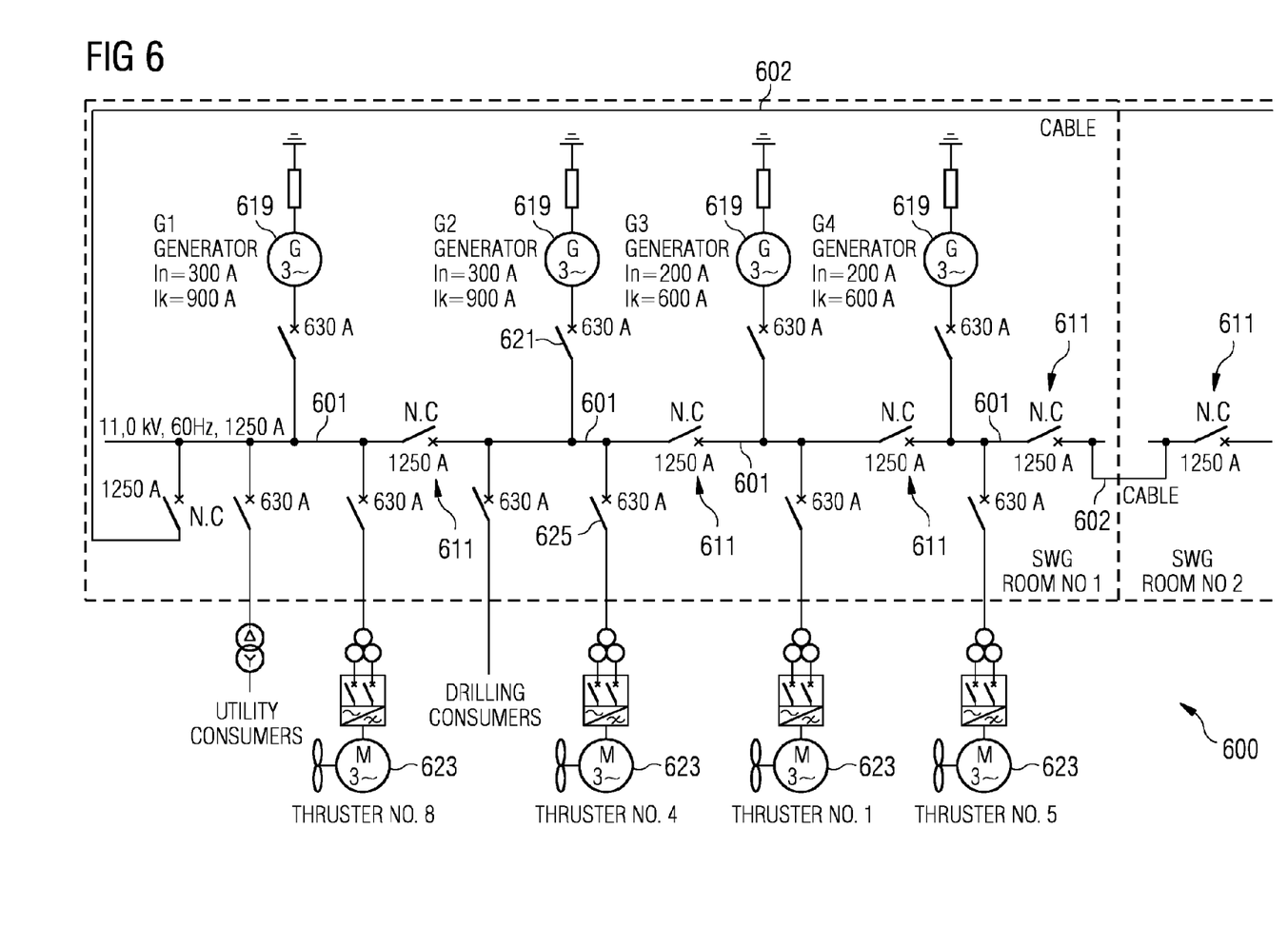
FIGS. 6 and 7 illustrate a power distribution system according to an example embodiment.
Figure 7:
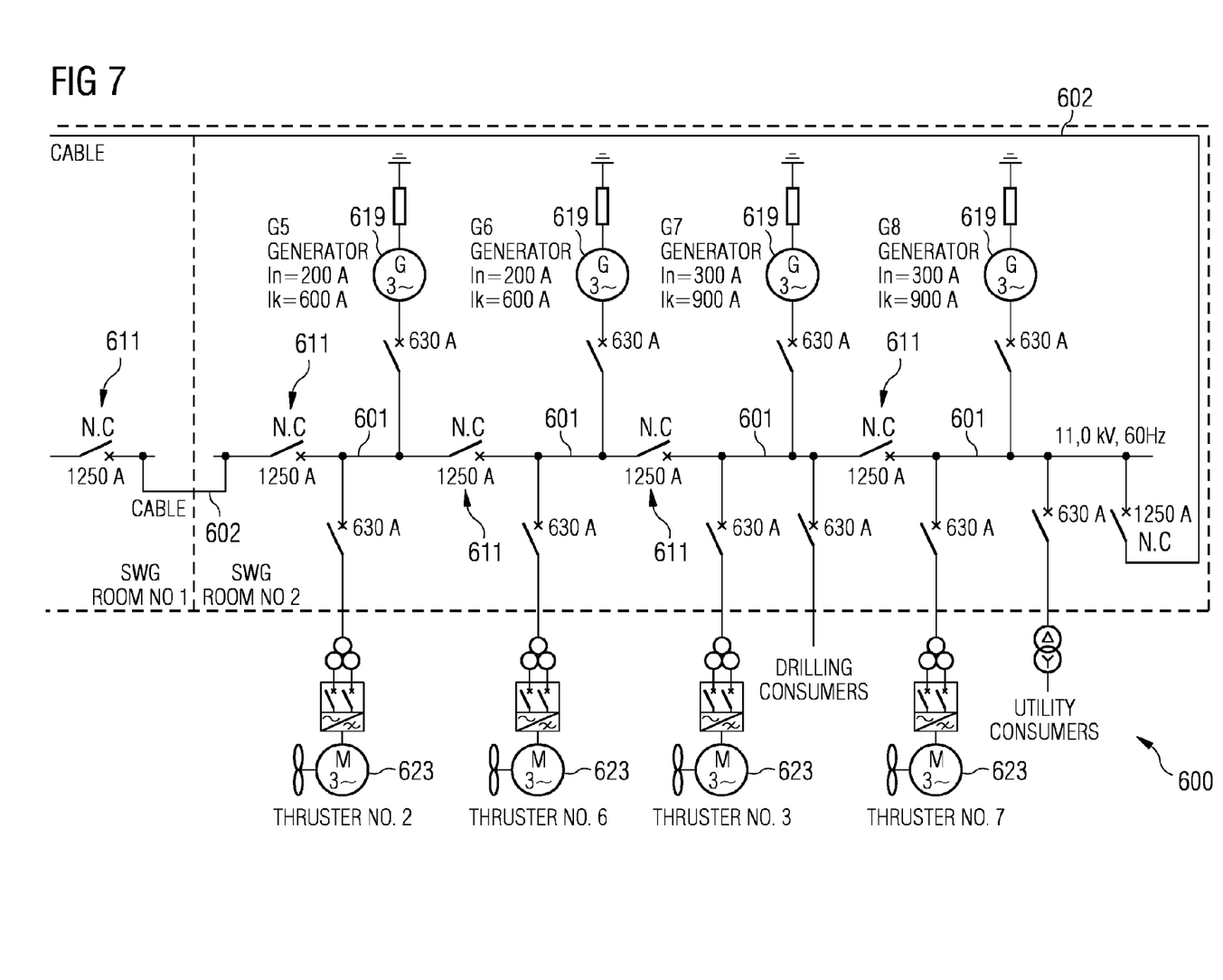

FIGS. 6 and 7 illustrate a main single line diagram of a two-line up switch gear for DP2 class vessel according to an embodiment. The power distribution system 600 illustrated in two portions in FIGS. 6 and 7 includes 8 busses 601 which are connected by interjacent switches 611. The switches 611 are constructed as the switch 111 illustrated in FIG. 1, thus comprising a relay and a breaker each. Each relay controls the corresponding breaker. In FIG. 6 those components of the power distribution system 600 are illustrated which are arranged in a first room, whereas FIG. 7 illustrates those components of the power distribution system 600 which are arranged in another separated room. The busses 601 are connected using the switches 611 to form a ring structure. The portions of the power distribution system 600 arranged in the two different rooms are connected to each other using two cables 602.

Figure 8:
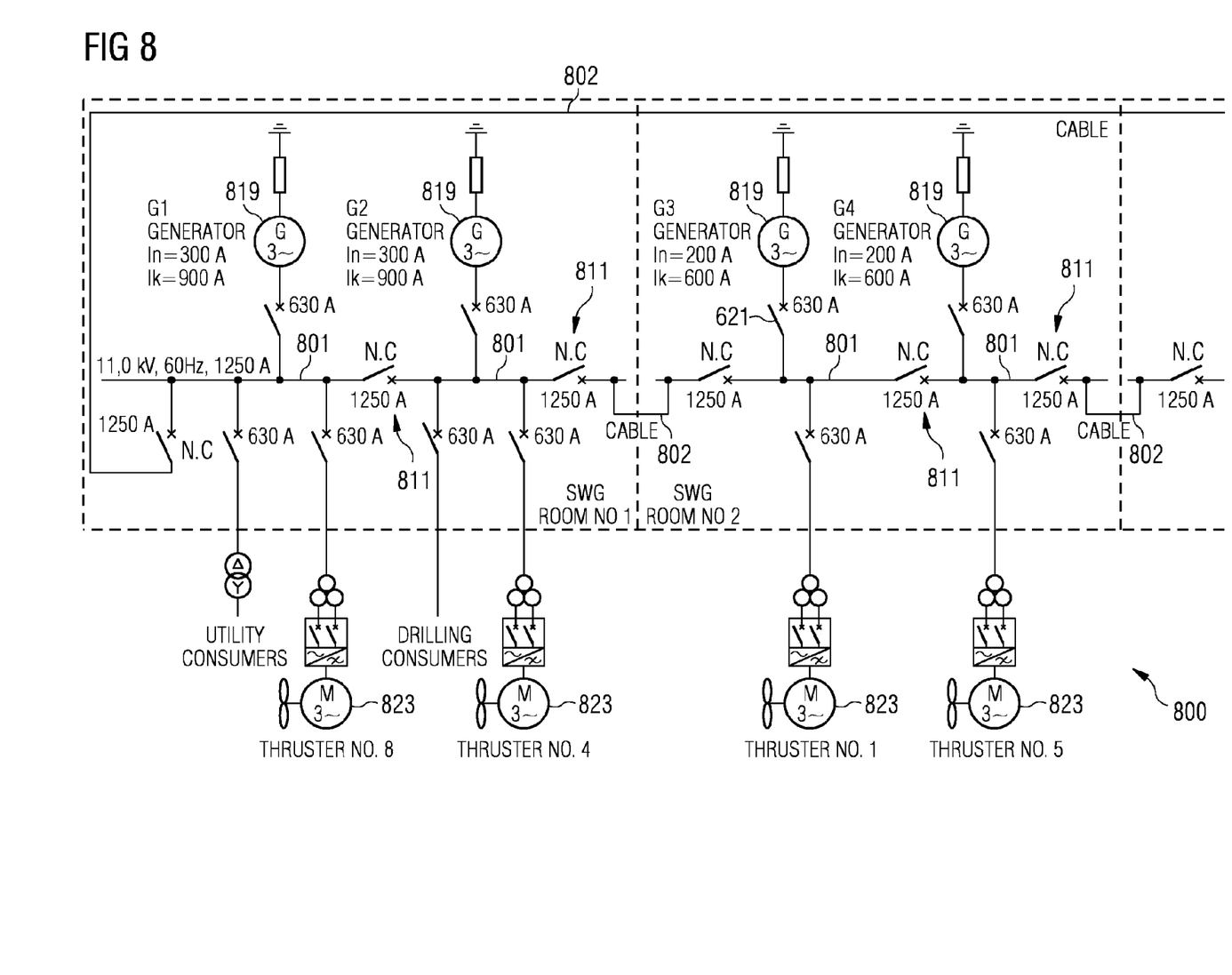
FIGS. 8 and 9 illustrate a power distribution system according to another example embodiment.
Figure 9:
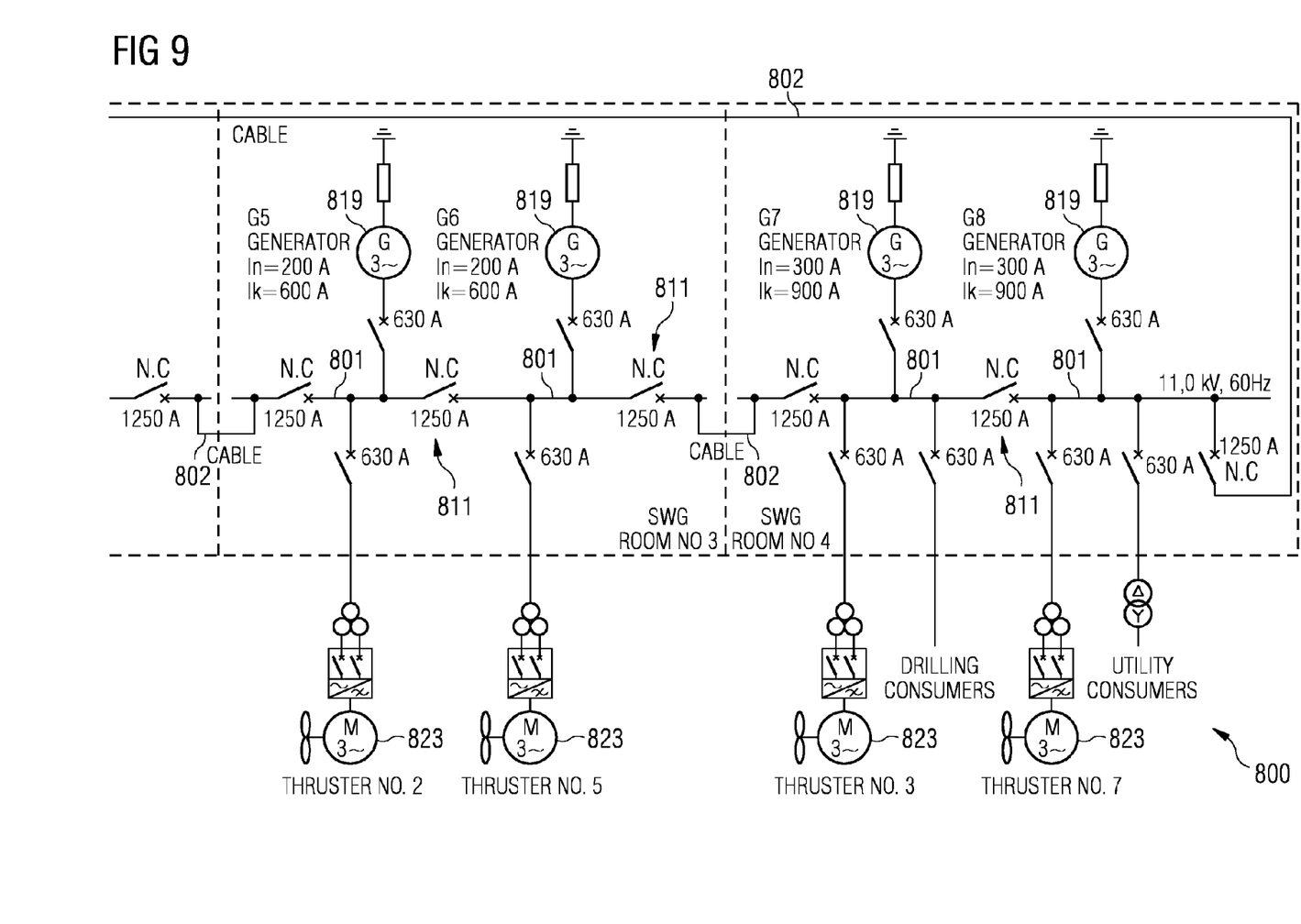

FIGS. 8 and 9 illustrate a main single line diagram of a four-line up switch gear for DP3 class vessel type power distribution system 800. Portions of the power distribution system 800 comprised in a first room and a second room are illustrated in FIG. 8, while portions of the power distribution system 800 located in a third room and a fourth room are illustrated in FIG. 9. Eight busses 801 are connected using switches 811 in an alternating manner to form a ring structure. Portions of the power distribution system 800 located in different rooms are connected to each other using four cables 802. Generators 819 (in the illustrated embodiments eight generators are provided) provide electric energy to the busses and from there to loads 823 (in the illustrated embodiment eight thrusters are connected as the loads).

Figure 10:
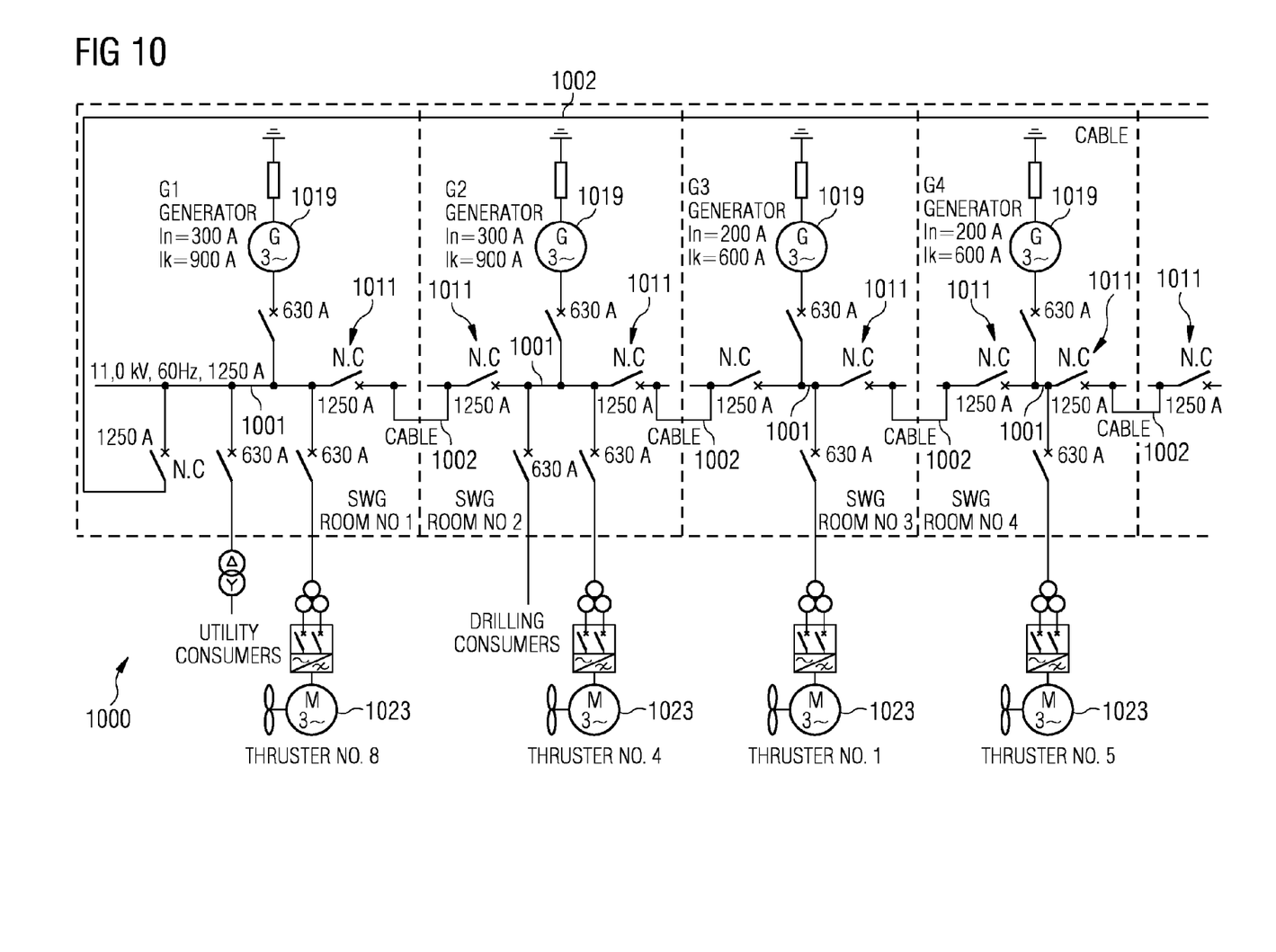
FIGS. 10 and 11 illustrate a power distribution system according to still another embodiment.
Figure 11:
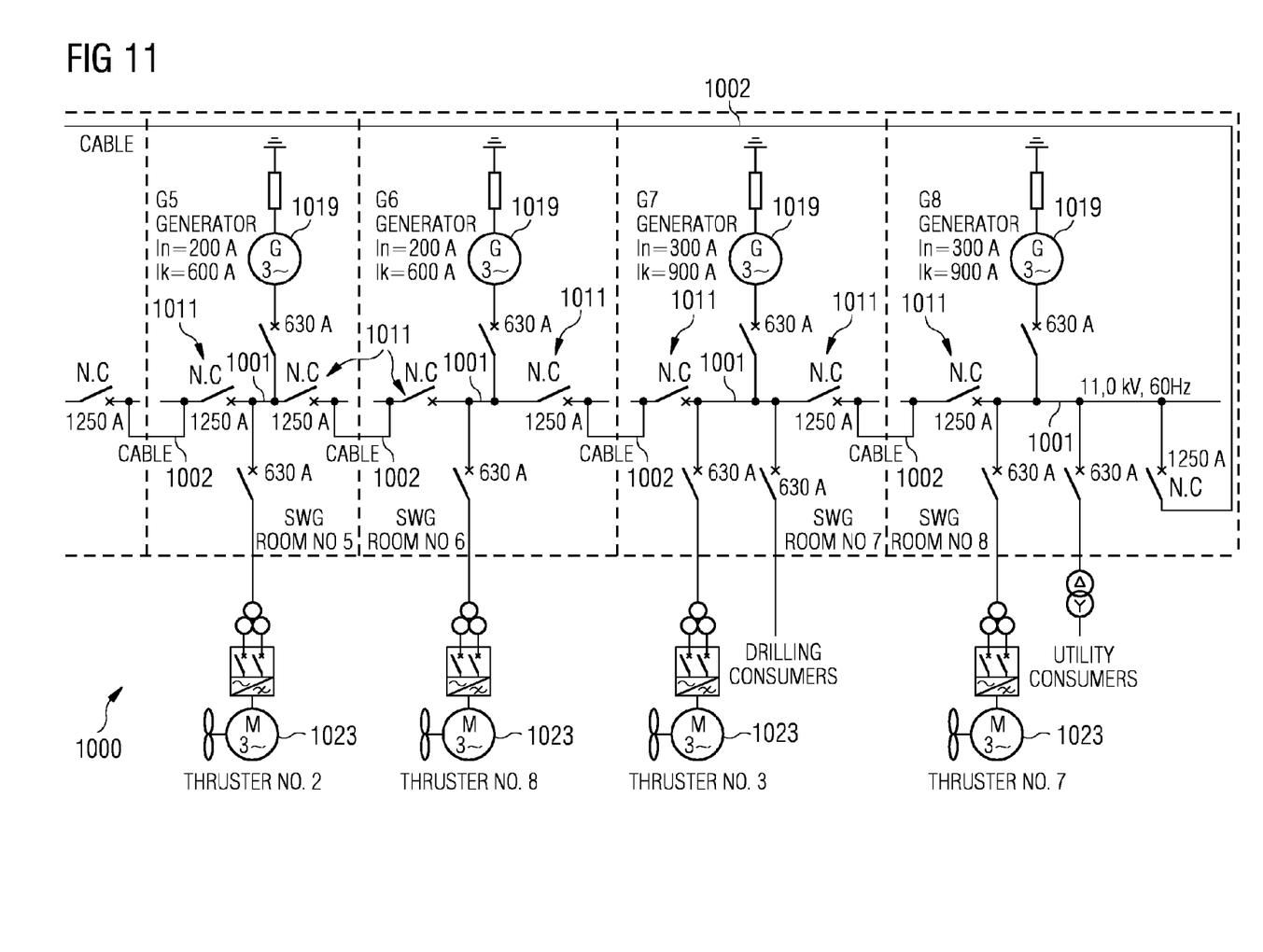

FIGS. 10 and 11 illustrate a main single line diagram of eight-line up switch gear for DP3 class vessel type power distribution system 1000. Portions of the power distribution system 1000 comprised in a first room, a second room, a third room and a fourth room are illustrated in FIG. 10, while portions of the power distribution system 1000 located in a fifth room, a sixth room, a seventh room and an eighth room are illustrated in FIG. 11. Plural busses 1001 are connected using plural switches 1002 to form a ring structure. Generators 1019 supply electric energy to the busses and from there to plural loads 1023.

Figure 12:
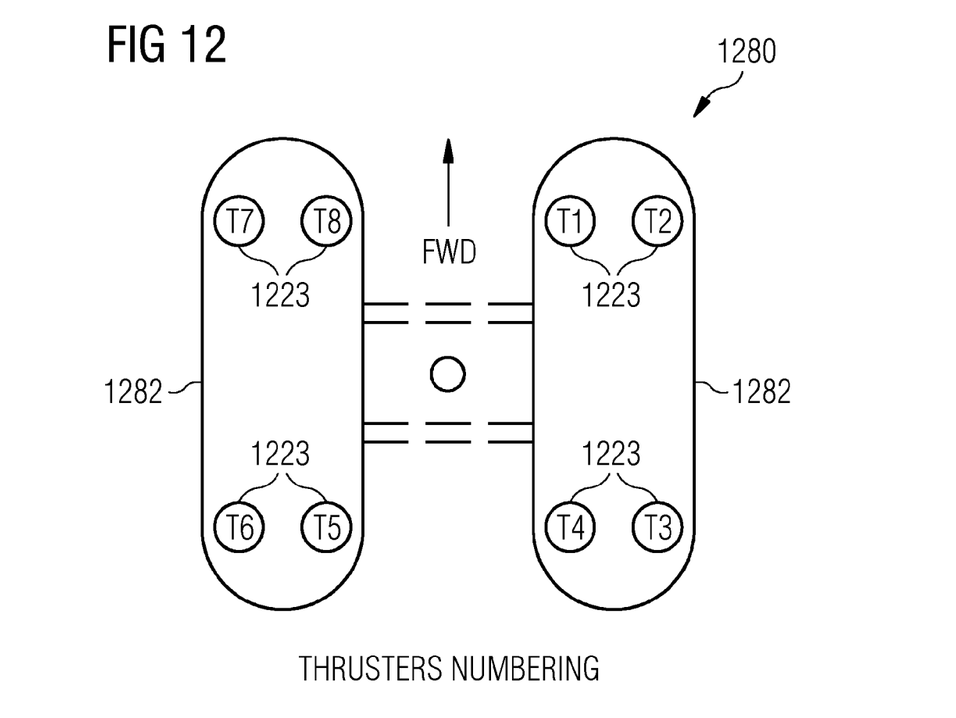
FIG. 12 schematically illustrates an example vessel comprising a power distribution system as illustrated in FIG. 1.

FIG. 12 schematically illustrates a vessel 1280 for which a power distribution system as illustrated in FIG. 1, FIGS. 6 and 7, FIGS. 8 and 9, or FIGS. 10 and 11 may be used. The vessel 1280 comprises two pontoons 1282 (submersed in the sea) each of which harbours four thrusters 1223. The thrusters 1223 are supplied with electric energy by a not illustrated power distribution system, such as the system 100, the system 600, the system 800 or the system 1000, as described above, for fail safe operation of the vessel 1280.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

What is claimed is:

1. Power distribution system for a dynamically positionable vessel, the power distribution system comprising:
  a plurality of busses comprising a first bus to which a load is connectable;

a plurality of switches comprising a first switch and a second switch
wherein the plurality of busses are connected via the plurality of switches in an interjacent manner to form a ring,
wherein the first bus is connected in between the first switch and the second switch, and
wherein the power distribution system is configured to open the first switch and concurrently open the second switch, thereby disconnecting the first bus from the ring, if (a) a first current flowing via the first switch in a direction towards the first bus is above a predetermined current threshold for longer than a predetermined time duration and (b) a second current flowing via the second switch in a direction towards the first bus is above the predetermined current threshold for longer than the predetermined time duration,
wherein each of the first switch and the second switch comprises a programmable relay including a logical unit providing logical functionality, and
wherein the first bus is identified using the logical functionality within the first switch and the second switch.

2. Power distribution system of claim 1, wherein the first switch is configured to determine the first current and a direction of the first current, and the second switch is configured to determine the second current and a direction of the second current.

3. Power distribution system of claim 1, wherein the first switch is configured to send an inhibit signal to the second switch for inhibiting the second switch from opening, if a first opposite current flowing via the first switch in a direction away from the first bus is above the predetermined current threshold for longer than the predetermined time.

4. Power distribution system of claim 3, wherein the second switch is configured to open if (a) the second switch does not receive the inhibit signal from the first switch, (b) the second current flowing via the second switch in a direction towards the first bus is above the predetermined current threshold for longer than the predetermined time, and (c) a voltage at the first bus is below a predetermined voltage threshold.

5. Power distribution system of claim 4, wherein the second switch is configured to open if a third current flowing via the second switch in a direction towards the first bus or in a direction away from the first bus is above another predetermined current threshold for longer than another predetermined time, wherein the other predetermined current threshold is greater than the predetermined current threshold or the other predetermined time is greater than the predetermined time.

6. Power distribution system of claim 1, wherein:
the plurality of busses comprises a second bus connected to the first bus via the second switch,
the plurality of switches comprises a third switch connected to the second bus, and
the second switch is configured to send an inhibit signal to the third switch for inhibiting the third switch from opening if the second current via the second switch in the direction towards the first bus is above the predetermined current threshold for longer than the predetermined time.

7. Power distribution system of claim 1, further comprising at least one generator connected to the first bus.

8. Power distribution system of claim 7, further comprising a generator switch via which the generator is connected to the first bus.

9. Power distribution system of claim 1, wherein the load is connectable to the first bus via a load switch.

10. Power distribution system of claim 1, wherein at least one of the third switch, the generator switch, and the load switch comprises a programmable relay including a logical unit.

11. A vessel comprising:
a power distribution system comprising:
a plurality of busses comprising a first bus to which a load is connectable;
a plurality of switches comprising a first switch and a second switch,
wherein the plurality of busses are connected via the plurality of switches in an interjacent manner to form a ring,
wherein the first bus is connected in between the first switch and the second switch, and
wherein the power distribution system is configured to open the first switch and concurrently open the second switch, thereby disconnecting the first bus from the ring, if (a) a first current flowing via the first switch in a direction towards the first bus is above a predetermined current threshold for longer than a predetermined time duration and (b) a second current flowing via the second switch in a direction towards the first bus is above the predetermined current threshold for longer than the predetermined time duration,
wherein each of the first switch and the second switch comprises a programmable relay including a logical unit providing logical functionality, and
wherein the first bus is identified using the logical functionality within the first switch and the second switch,
wherein the vessel is configured for dynamically positioning using at least two electrical motors.

12. The vessel of claim 11, configured for supporting an offshore oil platform or an offshore drilling platform.

13. A method for power distribution using a power distribution system for a dynamically positioned vessel, the power distribution system comprising a plurality of busses comprising a first bus to which a load is connectable; a plurality of switches comprising a first switch and a second switch, wherein the plurality of busses is connected via the plurality of switches in an interjacent manner to form a ring, and the first bus is connected in between the first switch and the second switch, wherein the method comprises:
determining a first current flowing via the first switch in a direction towards the first bus;
determining a second current flowing via the second switch in a direction towards the first bus; and
disconnecting the first bus from the ring by opening the first switch and concurrently opening the second switch, if the first current is above a predetermined current threshold for longer than a predetermined time duration and the second current is above the predetermined current threshold for longer than the predetermined time duration,
wherein each of the first switch and the second switch comprises a programmable relay including a logical unit providing logical functionality, and
wherein the first bus is identified using the logical functionality within the first switch and the second switch.

* * * * *